United States Patent
Park et al.

(10) Patent No.: US 8,984,219 B2
(45) Date of Patent: Mar. 17, 2015

(54) DATA STORAGE DEVICE AND METHOD OF WRITING DATA IN THE SAME

(75) Inventors: Dae-Kyu Park, Seoul (KR); Mi Kyoung Jang, Seoul (KR); Jinhyuk Kim, Hwaseong-si (KR); Han-Chan Jo, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 191 days.

(21) Appl. No.: 13/600,512

(22) Filed: Aug. 31, 2012

(65) Prior Publication Data

US 2013/0080688 A1   Mar. 28, 2013

(30) Foreign Application Priority Data

Sep. 22, 2011   (KR) .................. 10-2011-0095891

(51) Int. Cl.
*G06F 12/00*   (2006.01)
*G06F 3/06*   (2006.01)
*G06F 12/02*   (2006.01)

(52) U.S. Cl.
CPC ............ *G06F 3/061* (2013.01); *G06F 12/0246* (2013.01); *G06F 3/0659* (2013.01); *G06F 3/0688* (2013.01); *G06F 2212/7202* (2013.01); *G06F 2212/7203* (2013.01)
USPC ......................................................... 711/113

(58) Field of Classification Search
None
See application file for complete search history.

(56) References Cited

U.S. PATENT DOCUMENTS

| | | | |
|---|---|---|---|
| 7,552,311 B2 | 6/2009 | Hara et al. | |
| 2001/0053090 A1* | 12/2001 | Takata et al. | 365/185.08 |
| 2003/0002366 A1* | 1/2003 | Mizoguchi et al. | 365/201 |
| 2006/0143404 A1* | 6/2006 | Chen et al. | 711/141 |
| 2006/0259718 A1* | 11/2006 | Paley | 711/159 |
| 2008/0201553 A1* | 8/2008 | Kawamoto et al. | 711/206 |
| 2010/0023676 A1* | 1/2010 | Moon et al. | 711/103 |
| 2010/0082917 A1* | 4/2010 | Yang et al. | 711/157 |

FOREIGN PATENT DOCUMENTS

| | | |
|---|---|---|
| JP | 2001-350669 | 12/2001 |
| JP | 2004-318940 | 11/2004 |
| JP | 2006-155335 | 6/2006 |
| KR | 10-0336744 | 5/2002 |

* cited by examiner

*Primary Examiner* — Duc Doan

(74) *Attorney, Agent, or Firm* — Volentine & Whitt, PLLC

(57) ABSTRACT

A method is provided for writing data in a storage device, including a nonvolatile memory. The method includes receiving a pre-write command including a logical address and size information of write data, performing a pre-operation for optimization of a write operation based on the pre-write command, and writing the write data in the nonvolatile memory after the pre-operation is completed.

19 Claims, 8 Drawing Sheets

DATA STORAGE DEVICE AND METHOD OF WRITING DATA IN THE SAME

CROSS-REFERENCE TO RELATED APPLICATIONS

A claim of priority under 35 U.S.C. §119 is made to Korean Patent Application No. 10-2011-0095891 filed Sep. 22, 2011, in the Korean Intellectual Property Office, the entire contents of which are hereby incorporated by reference.

BACKGROUND

Various embodiments relate to a semiconductor memory device, and more particularly, to a data storage device and a data writing method thereof.

Semiconductor memory devices may be classified as volatile memory devices and nonvolatile memory devices. Volatile memory devices generally perform read and write operations at high speed, and lose stored contents when powered off. In comparison, nonvolatile memory devices retain stored contents even after being powered off. Therefore, nonvolatile memory devices are generally used for storing contents to be retained regardless of whether they are powered on or off. An example of a nonvolatile memory device is flash memory, which is typically more highly integrated as compared to conventional electrically erasable programmable read-only memory (EEPROM), for example, and which may be suitable as part of a mass storage device.

Physical characteristics of flash memory may be different from those of a hard disk drive. For example, flash memory may not support physical overwriting. Further, in case of flash memory, an erase operation may be carried out by blocks, while a write operation may be performed by pages. Flash Translation Layer (FTL) may be used to overcome physical limitations of flash memory. Various FTL techniques have been proposed and developed.

SUMMARY

According to an illustrative embodiment of the inventive concept, a method is provided for writing data in a storage device, including a nonvolatile memory. The method includes receiving a pre-write command including a logical address and size information of write data; performing a pre-operation for optimization of a write operation based on the pre-write command; and writing the write data in the nonvolatile memory after the pre-operation is completed.

The method may further include determining a write pattern of the write data based on the pre-write command. The write pattern may be a random write pattern or a sequential write pattern.

The pre-operation may include allocating a page or a block for the write data; backing up at least a part of data stored in the nonvolatile memory; erasing data stored in a cache memory, unless the data stored in the cache memory is hit on the write data; and/or loading at least a part of data stored in the nonvolatile memory into a cache memory.

The pre-write command and the write data may be provided from a host. The pre-write command may include a protocol used for communication between the host and the storage device.

According to another illustrative embodiment of the inventive concept, a data storage device includes a nonvolatile memory and a controller. The controller is configured to receive a pre-write command and write data, the pre-write command including a logical address and size information of the write data. The controller is further configured to perform a pre-operation for optimization of a write operation based on the pre-write command, and to write the write data in the nonvolatile memory after the pre-operation is completed.

The controller may be further configured to determine a write pattern of the write data based on the pre-write command. The pre-operation may include allocating a page or a block for the write data based, in part, on the determined write pattern. The pre-write command and the write data may be provided from a host, and the pre-write command may include a protocol used for communications between the host and the storage device.

The pre-operation may include backing up a part of data stored in the nonvolatile memory before writing the write data in the nonvolatile memory.

The data storage device may further include a cache memory having a data access speed faster than the nonvolatile memory. The pre-operation may include erasing data stored in the cache memory, based on whether data stored in the cache memory is hit on the write data. Also, the pre-operation may loading a part of data stored in the nonvolatile memory onto the cache memory.

According to another illustrative embodiment of the inventive concept, a method is provided for writing data in a nonvolatile memory of a storage device. The method includes receiving a pre-write command from a host, the pre-write command including a logical address and size information of write data; performing a pre-operation based on the pre-write command, performing the pre-operation including assigning a memory for the write data; receiving the write data from the host; and writing the received write data in the nonvolatile memory after performing the pre-operation.

The method may further include determining a write pattern of the write data based on the pre-write command before receiving the write data. When the write pattern is a sequential write pattern, assigning the memory for the write data includes allocating a block for the write data. When the write pattern is a random write pattern, assigning the memory for the write data includes allocating a page for the write data.

The method may further include determining whether the pre-write command contains an error, and sending a response signal indicating a result of the determination. The pre-write command, including the logical address and the size information of the write data, is again received in response to the response signal when the result of the determination indicates that the pre-write command contains an error.

BRIEF DESCRIPTION OF THE FIGURES

Illustrative embodiments will be more clearly understood from the following detailed description taken in conjunction with the accompanying drawings, in which.

DETAILED DESCRIPTION

Figure 1:
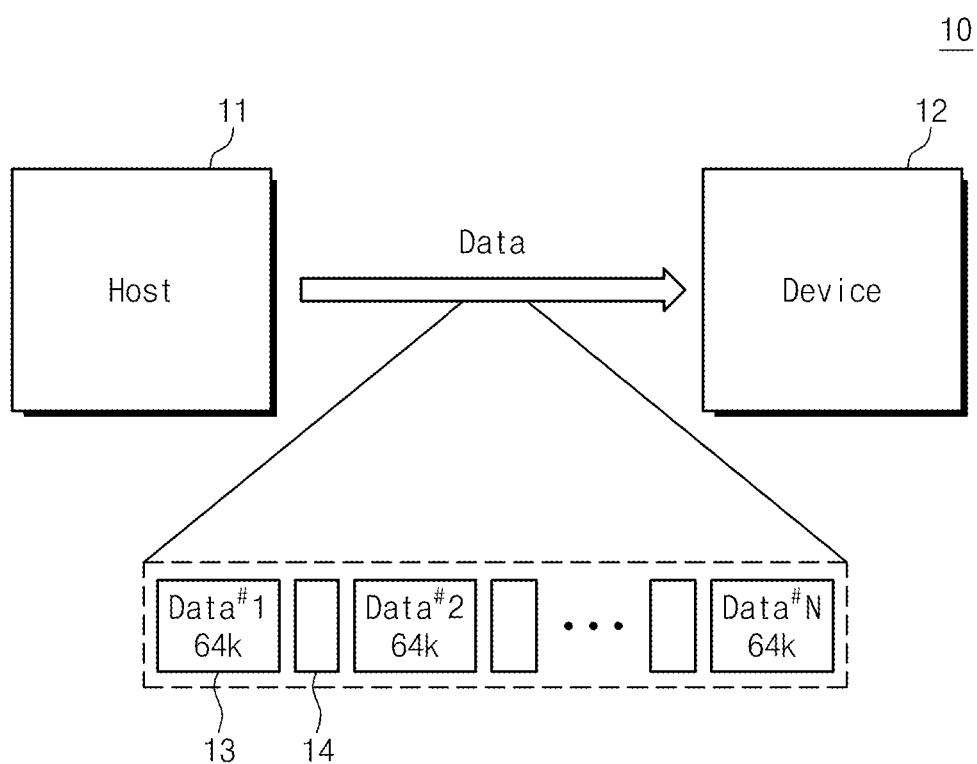
FIG. 1 is a diagram schematically illustrating a conventional data storage system.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the scope of the present teachings.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a conventional data storage system.

Referring to FIG. 1, data storage system 10 includes a host 11 and a storage device 12. To write data in the storage device 12, write data 13 is sent to the storage device 12 from the host 11. The write data 13 is divided into N units, indicated by Data#1, Data#2 . . . Data#N, where N is a positive integer. Each of the units of the write data 13 may be 64 Kbytes, for example. Interval data 14 is inserted between separated write data 13. For example, the interval data 14 may be a header for the write data 13 or an interval guide.

The storage device 12 assigns a memory for the write data 13 in response to input of the write data 13. At this time, a logical address LA may be different from a physical address where the write data 13 is to be stored. The storage device 12 performs an address mapping operation to convert the logical address from the host 11 into a physical address. Generally, the time taken to assign the memory slows write speed.

Address mapping may be performed according to a page mapping technique, a block mapping technique, a hybrid mapping technique, etc. Although the block mapping technique is generally most effective, it is useful only when the write data has a sequential write pattern. When a write pattern can be detected, it is possible to assign a memory efficiently. However, under various circumstances, it may be impossible to exactly predict a write pattern regardless of algorithms that may be employed. For example, in the conventional data storage system 10, if all the write data 13 is not received, it may be impossible to detect a write pattern.

Figure 2:
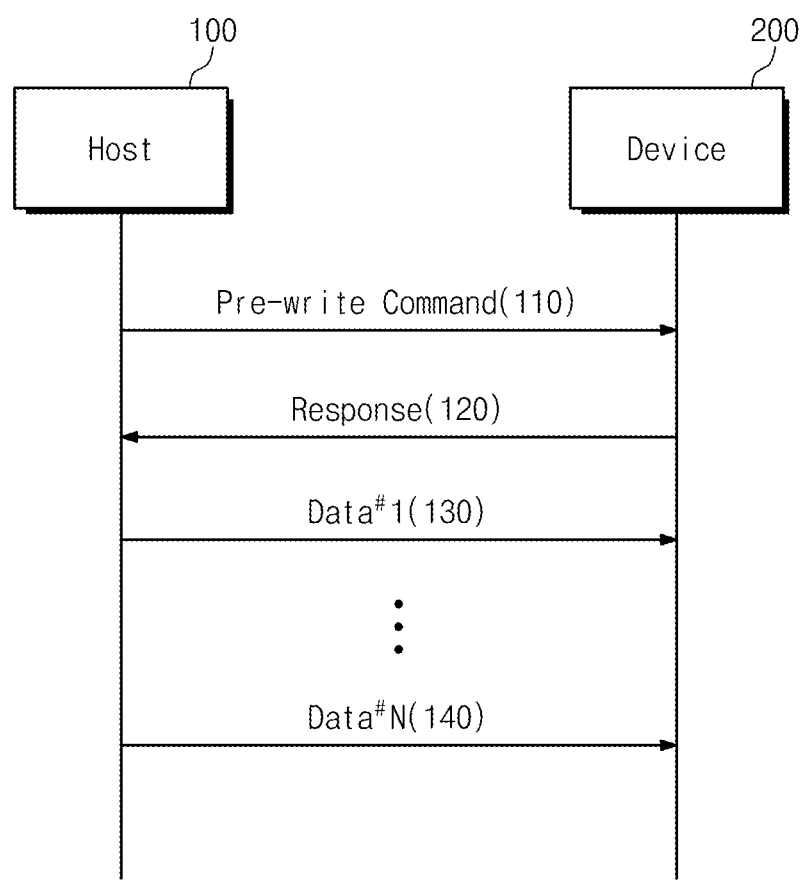
FIG. 2 is a diagram for describing a method of writing data in a data storage device, according to an embodiment of the inventive concept.

FIG. 2 is a diagram for describing a method of writing data in a data storage device, according to an embodiment of the inventive concept.

Referring to FIG. 2, data storage device 200 receives write data 130 (Data#1) through write data 140 (Data#N) from host 100. The data storage device 200 may include a memory controller and nonvolatile memory for storing write data (such as write data 130 through 140) under control of the memory controller, for example. For an efficient write operation, the data storage device 200 receives a pre-write command 110 from the host 100. The pre-write command 110 includes information associated with the write data 130 through 140. As described below, the pre-write command 110 may include a logical block address LBA and a sector count SC associated with each unit of the write data 130 through 140.

The pre-write command 110 is sent to the data storage device 200 prior to the write data 130 through 140. Accordingly, the data storage device 200 is able to obtain a write pattern, a storage location, and a size of the write data 130 through 140, based on the logical block address LBA and the sector count SC, before the write data 130 through 140 are input. Therefore, before the write data 130 and 140 are input, the data storage device 200 is able to allocate required memory according to the storage location and size information. Further, since the write pattern is obtained in advance of the write data 130 through 140 being input, a block memory may be assigned with respect to a sequential write pattern in advance of the write data 130 through 140 being input. The data storage device 200 may utilize a cache policy based on the pre-write command 110, as more fully described below.

When the pre-write command 110 is received, the data storage device 200 determines whether the pre-write command is contains errors, and send response signal 120 to the host 100 indicating the result of the determination. When the response signal 120 indicates that the pre-write command 110 is erroneous, the host 100 may again send the pre-write command 110. When the response signal 120 indicates that the pre-write command 110 is normal (contains no errors), the host 100 sends the write data 130 through 140 to the data storage device 200. The data storage device 200 stores the input write data 130 through 140 in a nonvolatile memory device (not shown) therein.

Because the memory for the write data is allocated in advance of the write data being input, write speed improves. Further, the write operation is efficiently performed by detecting a write pattern of the write data in advance of the write data being input.

Figure 3:
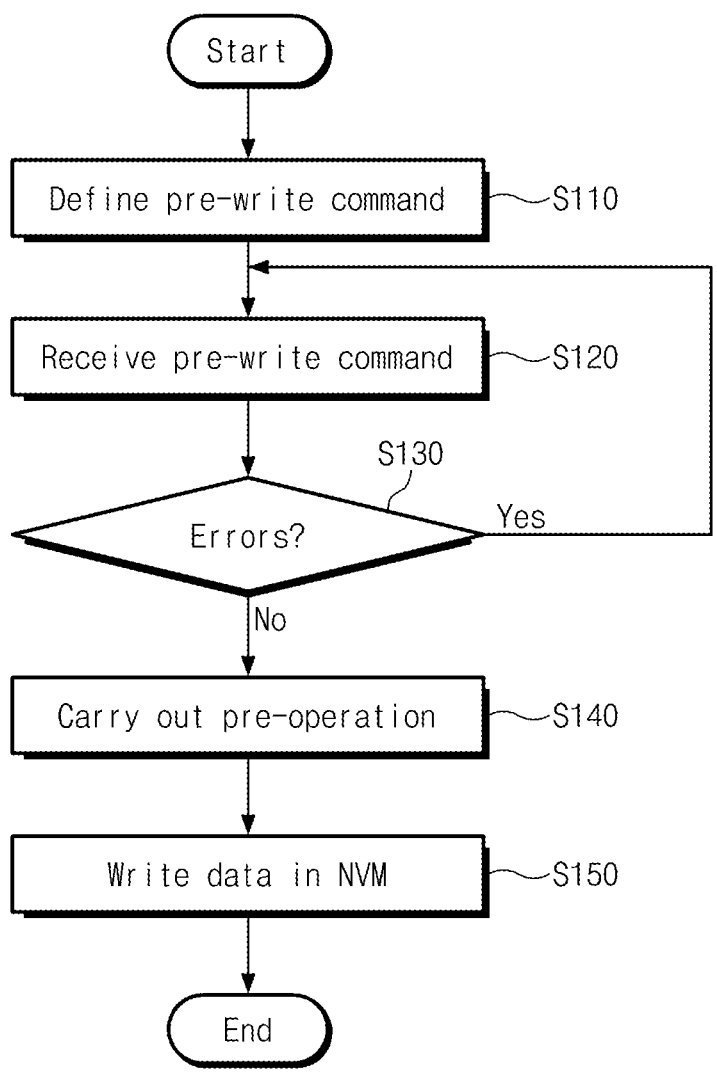
FIG. 3 is a flowchart illustrating a method of writing data in a data storage device, according to an embodiment of the inventive concept.

FIG. 3 is a flowchart illustrating a method of writing data in a data storage device, according to an embodiment of the inventive concept.

Referring to FIGS. 2 and 3, a pre-write command between the host 100 and the data storage device 200 is defined in operation S110. The pre-write command may be defined as a sort of protocol. For example, in an embodiment, the pre-write command may be defined by a data format in which a start logical address of the write data, a sector count of the write data, a valid flag, an access count, and a file name are listed sequentially. However, the inventive concept is not limited thereto. A format of the pre-write command may be interpreted to include data formats known in general data communications.

In operation S120, the data storage device 200 receives the pre-write command from the host 100. As mentioned above, the pre-write command may include a logical block address LBA and a sector count SC associated with write data.

In operation S130, the data storage device 200 determines whether there are errors in the input pre-write command. When the input pre-write command is determined to be erroneous (S130: Yes), a response signal including an error message is sent to the host 100. At this time, the method returns to operation S120 and the data storage device 200 waits to again receive the pre-write command. When the input pre-write command is determined not to be erroneous (S130: No), a normal response signal is sent to the host 100, and the method proceeds to operation S140.

In operation S140, the data storage device 200 executes a pre-operation for optimizing a subsequent write operation. The data storage device 200 refers to the logical block address LBA and the sector count SC included in the pre-write command to perform the pre-operation. For example, the data storage device 200 obtains a logical address, size information, and a write pattern of write data from the pre-write command.

In an embodiment, when the pre-write command is formatted to include a file name, the data storage device 200 also obtains the file name.

The pre-operation executed by the data storage device 200 may include one or more include preliminary operations needed for the write operation. For example, the pre-operation may include an operation of assigning a memory, for example. The data storage device 200 may allocate a memory according to the size of the write data. When the write pattern of the write data is a sequential write pattern, a block memory may be assigned. When the write pattern of the write data is a random write pattern, a page memory may be assigned. The memory assigning operation may include an erase operation associated with an allocated block.

The pre-operation also may include determining whether data stored in a cache memory is identical to the write data (i.e., whether there is a data hit), based on the pre-write command. When the data stored in the cache memory is determined to be identical to the write data (i.e., hit data), the data storage device 200 does not erase the hit data. This may be advantageous in that the hit data is not loaded again. When the data stored in a cache memory is determined not to be identical to the write data, the data storage device 200 may erase the cache memory. The cache memory may have a data access speed faster than the nonvolatile memory. The data storage device 200 is thus able to improve the efficiency of the cache memory by applying the pre-write command to the cache policy.

Further, the pre-operation may include backing up data for a write operation before writing the write data in the nonvolatile memory device. For example, a multi-bit cell (MLC) flash memory may perform least significant bit (LSB) and most significant bit (MSB) program operations sequentially. In this case, when the MSB program operation fails, it may be performed again. However, a program voltage applied during the MSB program operation may inadvertently affect results of the LSB program operation, performed prior to the MSB program operation(s). That is, although the MSB program operation fails, a threshold voltage of an LSB-programmed memory cell may vary. For this reason, LSB data may be backed up prior to programming MSB data, according to an embodiment. That is, the data storage device 200 may back up previously stored LSB data when the write data is MSB data. This determination may be made referring to the pre-write command.

Notably, the previously described pre-operation, executed by the data storage device 200, provides examples for purposes of discussion. It is understood that embodiments of the inventive concept are not limited thereto, and that the pre-operation may be interpreted to include various preliminary operations and combinations thereof needed for a write operation, without departing fro the scope of the present teachings.

In operation S150, the data storage device 200 writes the write data sent from the host 100 in the nonvolatile memory device (not shown). In various embodiments, the write data may received during operation S140 or after operation S140 is completed. When the write data is received during operation S140, the data storage device 200, writes the write data in the nonvolatile memory device after the pre-operation is completed or after the pre-operation is stopped.

In the data writing method described above, since memory allocation for the write data and data back up are performed in advance of the write data being input, the write speed is improved. Also, since the write pattern is determined in advance of the write data being input, the efficiency of the write operation and the cache memory operation is improved.

Figure 4:
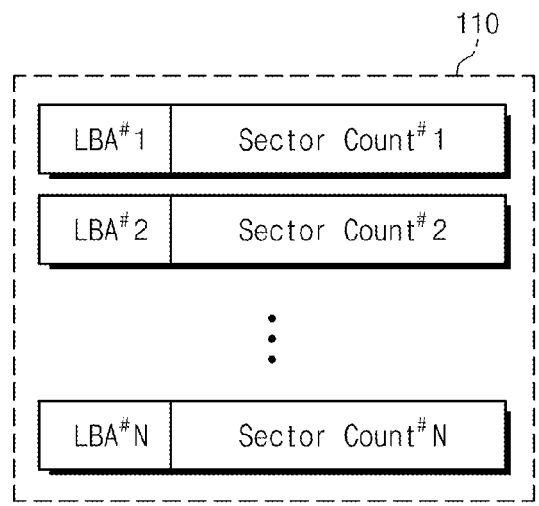
FIG. 4 is a diagram showing a format of a pre-write command described in FIG. 2, according to an embodiment of the inventive concept.

FIG. 4 is a diagram showing a representative format of a pre-write command described in FIG. 2, according to an embodiment of the inventive concept.

Referring to FIGS. 2 and 4, the pre-write command 110 includes logical block addresses LBA#1, LBA#2 ... LBA#N and sector counts Sector Count#1, Sector Count#2 ... Sector Count#N. The logical block addresses LBA#1, LBA#2 ... LBA#N and sector counts Sector Count#1, Sector Count#2 ... Sector Count#N may correspond to divided write data, respectively.

In another embodiment, the pre-write command 110 may be defined by a data format in which a start logical address of the write data, a sector count of the write data, a valid flag, an access count, and a file name are listed sequentially. However, the inventive concept is not limited thereto. A format of the pre-write command may be interpreted to include data formats known in general data communications.

Figure 5:
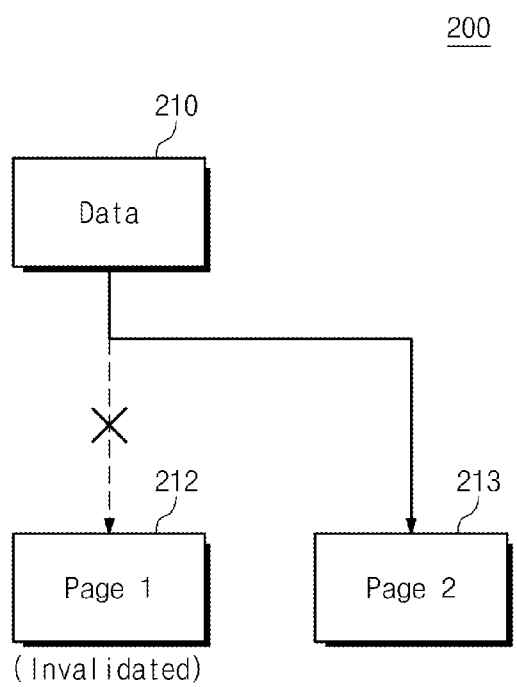
FIG. 5 is a diagram for describing a pre-operation, according to an embodiment of the inventive concept.

FIG. 5 is a diagram for describing a pre-operation, according to another embodiment of the inventive concept.

Referring to FIGS. 2 and 5, the data storage device 200 may include a first page 212 (Page 1) and a second page 213 (Page 1). For purposes of discussion, it may be assumed that the first page 212 is an invalidated page in which it is impossible to record data. In advance of write data 210 being input, the data storage device 200 may allocate memory based on a pre-write command, as described above. At this time, when the allocated memory is the invalidated first page 212, the allocation of the invalided first page 212 may be canceled, and the second page 213 may be allocated again. Thus, when the write data 210 is received, the data storage device 200 does not check the validity on the allocated memory separately. The write data 210 is recorded in the second page 213 immediately.

That is, the data storage device 200 checks the validity of an allocated memory in advance of the write data being input. The write data therefore may be immediately recorded in the allocated memory, skipping the validity checking operation upon input of the write data. Thus, the write speed is improved.

Figure 6:
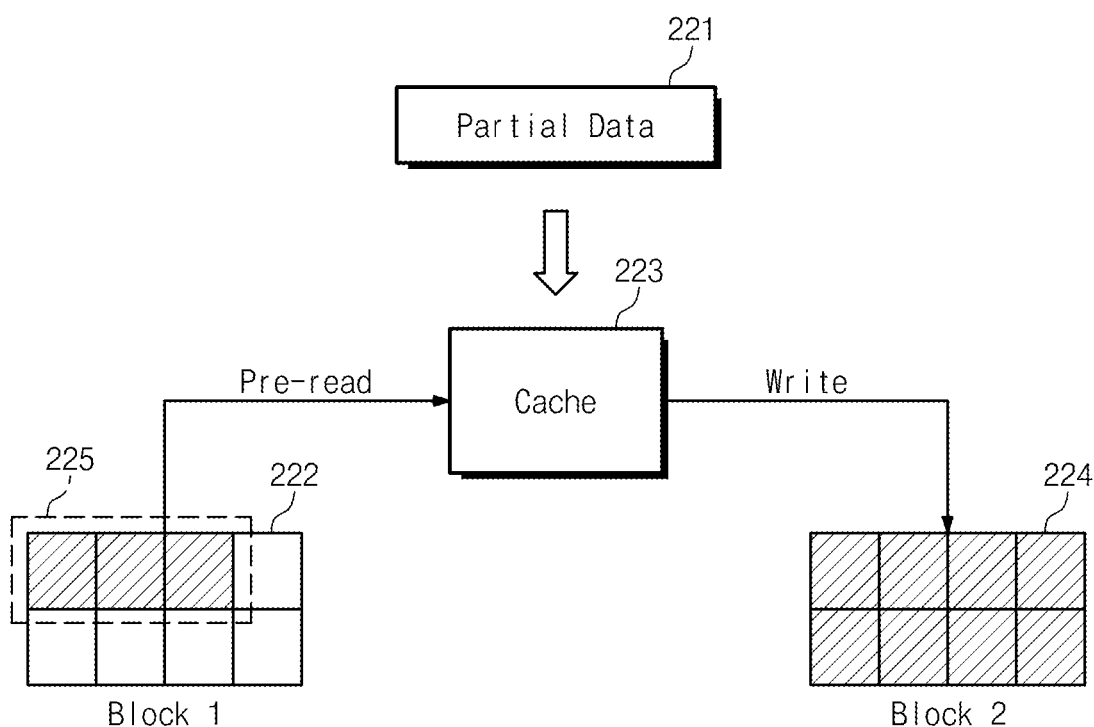
FIG. 6 is a diagram for describing a pre-operation, according to another embodiment of the inventive concept.

FIG. 6 is a diagram for describing a pre-operation, according to another embodiment of the inventive concept.

Referring to FIGS. 2 and 6, the data storage device 200 may include a first block 222 (Block 1), a second block 224 (Block 2), and a cache memory 223. For purposes of discussion, it may be assumed that data is stored in some pages of the first block 222, and that the second block 224 is assigned for write data.

In the depicted embodiment, the data storage device 200 determines that the write data to be received is partial data 221, based on a pre-write command, where partial data 221 indicates data smaller in size than the second block 224. When the write data is determined to be partial data 221, the data storage device 200 may load loading pages 225, storing valid data, of the first block 222 into the cache memory 223 in a pre-read operation. In an embodiment, the total size of the loading pages 225 and the partial data 221 may be determined to be smaller than that of the second block 224. This may be because a part of the loading pages 225 is loaded into the cache memory 223.

When the partial data 221 is received, the data storage device 200 loads the partial data 221 into the cache memory 223. The partial data 221 may then be recorded in the second block 224 with the loading pages 225, previously loaded into the cache memory 223. The first block 222 may be erased so that it can be assigned as a memory for subsequently received write data.

In the above description, since a ratio of pages, in which no information is stored, of the second block 224 is reduced, it is possible to efficiently manage the memory. For example, in the event that the number of blocks including empty pages increases, in general, memory management may be made inefficiently, and an erase count of a block may increase. However, such problems are reduced via the memory managing method according to the inventive concept.

Figure 7:
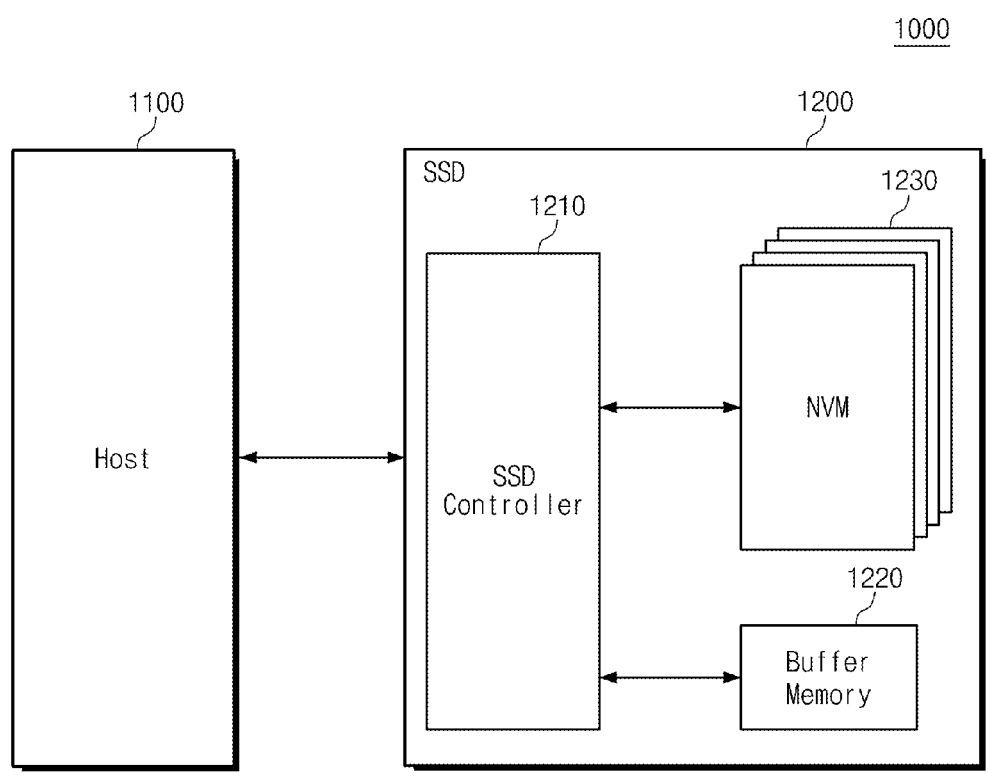
FIG. 7 is a block diagram illustrating a user device including a solid state disk, according to an embodiment of the inventive concept.

FIG. 7 is a block diagram illustrating a user device including a solid state disk (SSD), according to an embodiment of the inventive concept.

Referring to FIG. 7, user device 1000 includes host 1100 and SSD 1200. The SSD 1200 includes an SSD controller 1210, a buffer memory 1220, and a nonvolatile memory device 1230.

The SSD controller 1210 provides physical interconnection between the host 1100 and the SSD 1200. The SSD controller 1210 may include an interface with the SSD 1200 corresponding to a bus format of the host 1100. In particular, the SSD controller 1210 decodes commands provided from the host 1100, and accesses the nonvolatile memory device 1230 according to the decoding result. The bus format of the host 1100 may include, for example, Universal Serial Bus (USB), Small Computer System Interface (SCSI), PCI express, ATA, Parallel ATA (PATA), Serial ATA (SATA), Serial Attached SCSI (SAS), and the like.

The SSD controller 1210 receives a pre-write command, including a logical address and size information of write data, as described above. The SSD controller 1210 may determine a write pattern of the write data based on the pre-write command. The write pattern may be a random write pattern or a sequential write pattern. The SSD controller 1210 may then perform a pre-operation for optimization of the write operation, according to the pre-write command and the write pattern.

As an example of the pre-operation, the SSD controller 1210 may allocate a page or block, in which write data is to be recorded, in advance of the write data being input. At this time, when the write pattern is determined to be a random write pattern, a memory is allocated by page unit. When the write pattern is determined to be a sequential write pattern, a memory is allocated by block unit. In general, the write efficiency of the latter case is better than that of the former case.

In case of an MLC flash memory, the SSD controller 1210 may back up part of the data stored in the MLC flash memory in advance of the write data being input. For example, when the write data is related to MSB data, previously stored LSB data may be backed up to address program fail, in advance of the write data being input.

The pre-operation may include a cache policy. In the event that data loaded into a cache memory is hit on write data to be received later, the remaining data other than the hit data may be erased. The SSD controller 1210 may load a part of data stored in a nonvolatile memory into the cache memory. When write data to be received is partial data, it may be written in one block together with the data loaded into the cache memory. The efficiency and speed of a write operation is improved by performing the above-described pre-operations in advance of write data being input and/or stored.

The buffer memory 1220 temporarily stores write data provided by the host 1100 or data read out from the nonvolatile memory device 1230. In the event that data existing in the nonvolatile memory device 1230 is cached at a read request of the host 1100, the buffer memory 1220 may support a cache function of providing cached data directly to the host 1100. Typically, the data transfer speed of the bus format (e.g., SATA or SAS) of the host 1100 is higher than that of a memory channel of the SSD 1200. In the event that the interface speed of the host 1100 is significantly faster, the buffer memory 1220 may be provided with a large storage capacity in order to minimize lower performance due to the speed difference. The buffer memory 1220 may be a synchronous dynamic random-access memory (DRAM), for example, to provide sufficient buffering to the SSD 1200 when used as an auxiliary mass storage device. However, the buffer memory 1220 may include other types of memory without departing from the scope of the present teachings.

The nonvolatile memory device 1230 is a storage medium of the SSD 1200. For example, the nonvolatile memory device 1230 may be formed of a NAND flash memory device having mass storage capacity. In an embodiment, the nonvolatile memory device 1230 may be formed of multiple memory devices. In this case, the memory devices may be connected with the SSD controller 1210 by channel units. The nonvolatile memory device 1230 is not limited to a NAND flash memory device. For example, the storage medium of the SSD 1200 may include phase-change RAM (PRAM), magnetic RAM (MRAM), resistive RAM (ReRAM), ferroelectric RAM (FRAM), NOR flash memory, etc. Further, the inventive concept may be applied to memory systems which use different types of memory devices together. A volatile memory device (e.g., DRAM) can be used as the storage medium.

Figure 8:
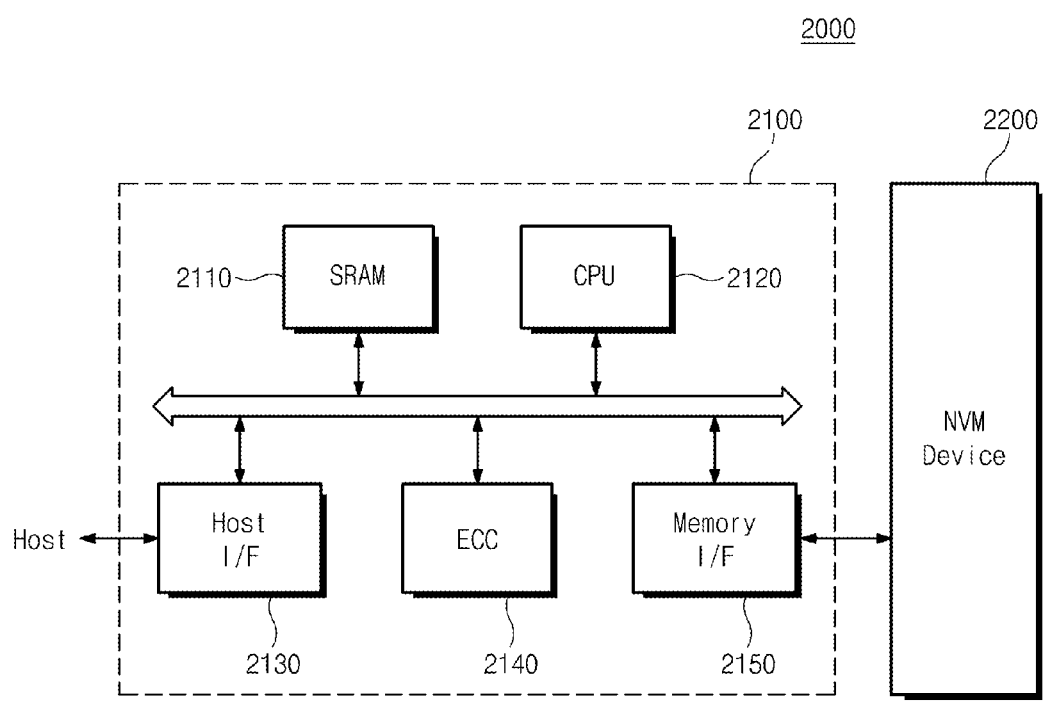
FIG. 8 is a block diagram illustrating a memory system, according to an embodiment of the inventive concept.

FIG. 8 is a block diagram schematically illustrating a memory system, according to an embodiment of the inventive concept.

Referring to FIG. 8, data storage device 2000 includes memory controller 2100 and nonvolatile memory device 2200, which may include flash memory, for example. The memory controller 2100 is configured to control the nonvolatile memory device 2200. The memory controller 2100 and the nonvolatile memory device 2200 may constitute a memory card, for example.

In the depicted embodiment, the memory controller 2100 includes static RAM (SRAM) 2110, central processing unit (CPU) 2120, host interface (I/F) 2130, error correcting code (ECC) circuit 2140, and memory I/F 2150, which are electrically connected via a bus. The SRAM 2110 may be used as a working memory, and may include a lookup table for storing an update number associated with each page of data, for example. The host interface 2130 includes the data exchange protocol of the host connected to the data storage device 2000. The ECC circuit 2140 is configured to detect and correct errors in data read out from the nonvolatile memory device 2200. The memory interface 2150 is configured to interface with the nonvolatile memory device 2200, according to embodiments of the inventive concept. As a processing unit, the CPU 2120 is configured to perform overall control operations for exchanging data. Although not shown, the data storage device 2000 may further include read only memory (ROM) for storing code data for interfacing with the host.

The memory controller 2100 may receive a pre-write command including a logical address and size information of write data from a host. The memory controller 2100 may determine a write pattern of the write data based on the pre-write command. The write pattern may be a random write pattern or a sequential write pattern. The memory controller 2100 then performs a pre-operation for optimization of the write operation. The pre-operation may be performed using the techniques described above. The efficiency and speed of the write operation is improved by performing the pre-operations in advance of the write data being input and/or stored.

The nonvolatile memory device 2200 may be implemented as a multi-chip package, formed of multiple flash memory chips, for example. The above-described data storage device 2000 may be provided as a high-reliability storage medium with low error probability. The memory controller 2100 may be configured to communicate with an external device (e.g., the host) via one of various interface protocols such as USB, MMC, PCI-E, SAS, SATA, PATA, SCSI, ESDI, IDE, etc.

Figure 9:
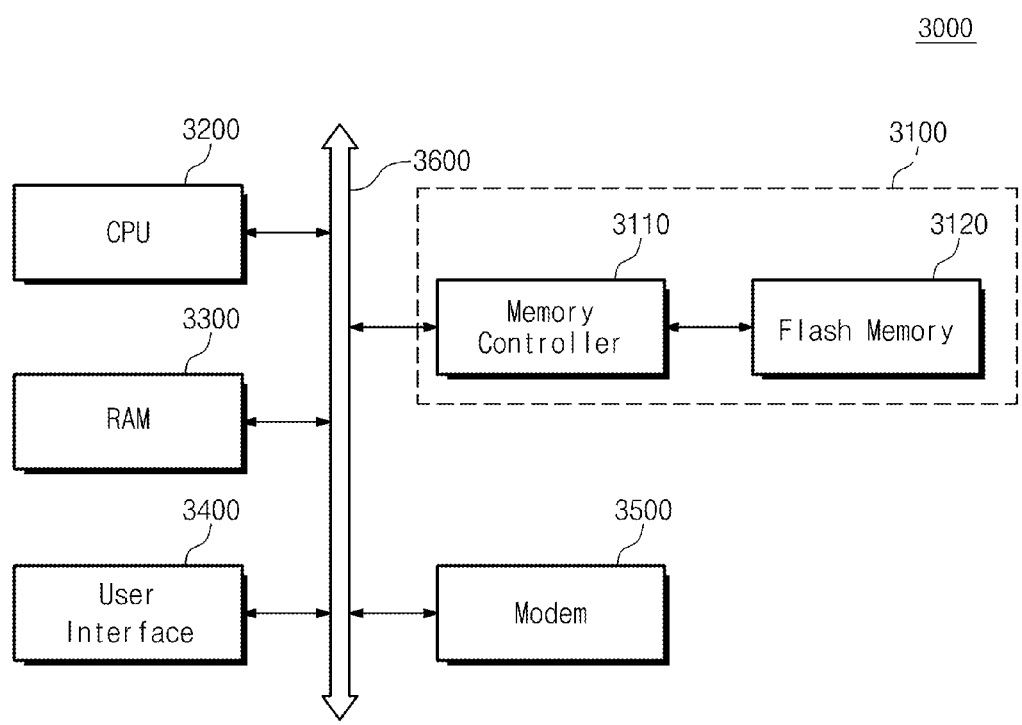
FIG. 9 is a diagram schematically illustrating a computing system including a flash memory device, according to an embodiment of the inventive concept.

FIG. 9 is a block diagram schematically illustrating a computing system including a flash memory device, according to an embodiment of the inventive concept.

Referring to FIG. 9, computing system 3000 includes memory system 3100, CPU 3200, RAM 3300, user interface 3400, and modem 3500, such as a baseband chipset, which are electrically connected via bus 3600. The memory system 3100 includes memory controller 3110 and flash memory 3120. The memory system 3100 may be configured to be substantially the same as the SSD 1200 in FIG. 7 or the data storage device 2000 in FIG. 8, for example.

In the event that the computing system 3000 is a mobile device, it may further include a battery (not shown) for powering the computing system 3000. Although not shown, the computing system 3000 may further include an application chipset, a camera image processor (CIS), mobile DRAM, and the like. The memory system 3100 may constitute a solid state drive/drive (SSD) which uses nonvolatile memory to store data, for example. Alternatively, the memory system 3100 may be implemented by fusion memory, such as One-NAND flash memory, for example.

When a write request is issued from the CPU 3200, the memory controller 3110 receives a pre-write command including a logical address and size information of write data. The memory controller 3110 determines a write pattern of the write data based on the pre-write command. The write pattern may be a random write pattern or a sequential write pattern. The memory controller 3110 then performs a pre-operation for optimization of the write operation. The pre-operation may be performed according to the techniques described above. The efficiency and speed of the write operation is thereby improved by performing the pre-operation in advance of the write data being input.

In various embodiments, a nonvolatile memory device and/or a memory controller may be packed by various types of packages, such as Package on Package (PoP), Ball Grid Arrays (BGAs), Chip Scale Packages (CSPs), Plastic Leaded Chip Carrier (PLCC), Plastic Dual In-Line Package (PDI2P), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A method of writing data in a storage device including a nonvolatile memory, the method comprising:
   receiving a pre-write command for providing information associated with write data, the pre-write command including a logical address and size information of the write data;
   determining whether the received pre-write command contains an error;

when it is determined that the received pre-write command does not contain an error, performing a pre-operation for optimization of a write operation based on the received pre-write command, the write operation being for writing the write data; and writing the write data corresponding to the received pre-write command in the nonvolatile memory after the pre-operation is completed, wherein performing the pre-operation comprises:

detecting a write pattern of the write data based on the received pre-write command;

determining whether the write data is partial data based on the received pre-write command;

checking validity of pages of memory of the nonvolatile memory based on the received pre-write command; and allocating the memory for the write data based on at least one of the detected write pattern, the partial data determination result, and the validity checking result.

2. The method of claim 1, wherein the write pattern is a random write pattern or a sequential write pattern.

3. The method of claim 1, wherein performing the pre-operation further comprises backing up at least a part of data stored in the nonvolatile memory.

4. The method of claim 1, wherein performing the pre-operation further comprises erasing data stored in a cache memory, unless the data stored in the cache memory is hit on the write data.

5. The method of claim 1, wherein performing the pre-operation further comprises loading at least a part of data stored in the nonvolatile memory into a cache memory.

6. The method of claim 1, wherein the pre-write command and the write data are provided from a host, and the pre-write command includes a protocol used for communication between the host and the storage device.

7. The method of claim 1, wherein the partial data indicates data smaller in size than a memory block.

8. A data storage device comprising:

a nonvolatile memory; and a controller configured to receive a pre-write command for providing information associated with write data including a logical address and size information of the write data to be written in the nonvolatile memory, to determine whether the received pre-write command contains an error, and when the received pre-write command does not contain an error, to perform a pre-operation for optimization of a write operation based on the received pre-write command, the write operation being for writing the write data, and to receive and write the write data corresponding to the received pre-write command in the nonvolatile memory after the pre-operation is completed, wherein the pre-operation performed by the controller comprises:

detecting a write pattern of the write data based on the received pre-write command;

determining whether the write data is partial data based on the received pre-write command;

checking validity of pages of memory of the nonvolatile memory based on the received pre-write command; and allocating the memory for the write data based on at least one of the detected write pattern, the partial data determination result, and the validity checking result.

9. The data storage device of claim 8, wherein the pre-operation further comprises backing up a part of data stored in the nonvolatile memory before writing the write data in the nonvolatile memory.

10. The data storage device of claim 8, further comprising:

a cache memory having a data access speed faster than the nonvolatile memory, wherein the pre-operation further comprises erasing data stored in the cache memory, based on whether data stored in the cache memory is hit on the write data.

11. The data storage device of claim 8, further comprising:

a cache memory having a data access speed faster than the nonvolatile memory, wherein the pre-operation further comprises loading a part of data stored in the nonvolatile memory onto the cache memory.

12. The data storage device of claim 8, wherein the pre-write command and the write data are provided from a host, and the pre-write command includes a protocol used for communications between the host and the storage device.

13. The data storage device of claim 8, wherein the partial data indicates data smaller in size than a memory block.

14. A method of writing data in a nonvolatile memory of a storage device, the method comprising:

receiving a pre-write command for providing information associated with write data from a host, the pre-write command including a logical address and size information of the write data;

determining whether the received pre-write command contains an error;

when it is determined that the pre-write command does not contain an error, performing a pre-operation based on the received pre-write command;

receiving the write data corresponding to the received pre-write command from the host; and writing the received write data in the nonvolatile memory after performing the pre-operation, wherein performing the pre-operation further comprises:

determining whether the write data is partial data based on the received pre-write command; and checking validity of pages of memory of the nonvolatile memory based on the received pre-write command; and assigning the memory for the write data based on at least one of the partial data determination result and the validity checking result.

15. The method of claim 14, wherein performing the pre-operation further comprises:

detecting a write pattern of the write data based on the pre-write command before receiving the write data, wherein assigning the memory for the write data comprises assigning the memory for the write data based on at least one of the detected write pattern, the partial data determination result, and the validity checking result.

16. The method of claim 15, wherein when the detected write pattern is a sequential write pattern, assigning the memory for the write data comprises:

allocating a block for the write data.

17. The method of claim 15, wherein when the detected write pattern is a random write pattern, assigning the memory for the write data comprises:

allocating a page for the write data.

18. The method of claim 14, further comprising:

again receiving the pre-write command including the logical address and the size information of the write data when it is determined that the pre-write command contains an error.

19. The method of claim 14, wherein the partial data indicates data smaller in size than a memory block.

\* \* \* \* \*